US009026443B2

United States Patent
Lenke

(10) Patent No.: US 9,026,443 B2
(45) Date of Patent: May 5, 2015

(54) CONTEXT BASED VOICE ACTIVITY DETECTION SENSITIVITY

(75) Inventor: Nils Lenke, Rheinbach (DE)

(73) Assignee: Nuance Communications, Inc., Burlington, MA (US)

(*) Notice: Subject to any disclaimer, the term of this patent is extended or adjusted under 35 U.S.C. 154(b) by 35 days.

(21) Appl. No.: 13/518,406

(22) PCT Filed: Mar. 26, 2010

(86) PCT No.: PCT/US2010/028825
§ 371 (c)(1),
(2), (4) Date: Jun. 22, 2012

(87) PCT Pub. No.: WO2011/119168
PCT Pub. Date: Sep. 29, 2011

(65) Prior Publication Data
US 2012/0271634 A1 Oct. 25, 2012

(51) Int. Cl.
*G10L 15/22* (2006.01)
*G10L 25/78* (2013.01)

(52) U.S. Cl.
CPC .............. *G10L 15/22* (2013.01); *G10L 25/78* (2013.01); *G10L 2025/786* (2013.01)

(58) Field of Classification Search
CPC .............................. G10L 15/222; G10L 15/22
USPC ........................... 704/251, 226–229, 270–278
See application file for complete search history.

(56) References Cited

U.S. PATENT DOCUMENTS

| 7,069,213 | B2 * | 6/2006 | Thompson | 704/231 |
| 7,162,421 | B1 | 1/2007 | Zeppenfeld et al. | |
| 8,000,971 | B2 * | 8/2011 | Ljolje | 704/275 |
| 2002/0184031 | A1 * | 12/2002 | Brittan et al. | 704/260 |
| 2002/0184373 | A1 * | 12/2002 | Maes | 709/228 |
| 2003/0088421 | A1 * | 5/2003 | Maes et al. | 704/270.1 |
| 2003/0171928 | A1 * | 9/2003 | Falcon et al. | 704/275 |
| 2004/0230637 | A1 * | 11/2004 | Lecoueche et al. | 709/200 |
| 2006/0020471 | A1 * | 1/2006 | Ju et al. | 704/275 |
| 2006/0241948 | A1 * | 10/2006 | Abrash et al. | 704/275 |
| 2007/0005369 | A1 * | 1/2007 | Potter | 704/275 |
| 2007/0198268 | A1 * | 8/2007 | Hennecke | 704/270 |
| 2008/0004881 | A1 * | 1/2008 | Attwater et al. | 704/275 |
| 2009/0112595 | A1 * | 4/2009 | Ljolje | 704/256.2 |
| 2009/0112599 | A1 * | 4/2009 | Ljolje | 704/270 |
| 2010/0030558 | A1 | 2/2010 | Herbig et al. | |
| 2012/0271634 | A1 * | 10/2012 | Lenke | 704/251 |

FOREIGN PATENT DOCUMENTS

| DE | EP2148325 | * | 1/2010 | G10L 15/22 |
| EP | 2 148 325 A1 | | 1/2010 | |

OTHER PUBLICATIONS

U.S. Appl. No. 12/507,444, filed Jul. 22, 2009, Herbig et al.
(Continued)

*Primary Examiner* — Michael N Opsasnick
(74) *Attorney, Agent, or Firm* — Daly, Crowley, Mofford & Durkee, LLP

(57) ABSTRACT

A speech dialog system is described that adjusts a voice activity detection threshold during a speech dialog prompt to reflect a context-based probability of user barge in speech occurring. For example, the context-based probability may be based on the location of one or more transition relevance places in the speech dialog prompt.

25 Claims, 5 Drawing Sheets

(56) References Cited

OTHER PUBLICATIONS

Office Action in U.S. Appl. No. 12/507,444, dated Apr. 1, 2013, 17 pages.
Response to Office Action in U.S. Appl. No. 12/507,444, filed on Aug. 1, 2013, 19 pages.
Final Office Action in U.S. Appl. No. 12/507,444, dated Nov. 15, 2013, 19 pages.
Notice of Appeal filed in U.S. Appl. No. 12/507,444, filed on Jan. 21, 2014, 4 pages.
Extended European Search Report in European Application No. 08013196.4 dated Sep. 19, 2008, 11 pages.
Ittycheriah et al.,: "Detecting User Speech in Barge-In Over Prompts Using Speaker Identification Methods", 6$^{th}$ European Conference on Speech Communication and Technology. Eurospeech '00, Sep. 5, 1999, pp. 327-330, XP001076116, Budapest, Hungary.
Ljolje et al.,: "Discriminative Training of Multi-State Barge-In Models", IEEE Workshop on Automatic Speech Recognition and Understanding (ASRU), Dec. 1, 2007, pp. 353-358,XP031202087, Tokyo, Japan.
Rose et al.,: "A Hybrid Barge-In Procedure for More Reliable Turn-Taking in Human-Machine Dialog Sytems", Automatic Speech Recognition and Understanding, 2003. ASRU '03. 2003 IEEE Workshop on St. Thomas, VI, USA, Nov. 30-Dec. 3, 2003, Piscataway, NJ, USA, IEEE, Nov. 30, 2003, pp. 198-203, XP010713188. ISBN: 978-0-7803-7980-0.
Setlur et al., "Recognition-Based Word Counting for Reliable Barge-In and Early Endpoint Detection in Continuous Speech Recognition", 5$^{th}$ International Conference on Spoken Language Processing, Oct. 1, 1998, p. 168, XP007000119, Sydney, Australia.
European Application No, 10 716 929.4-1910 Office Action dated Oct. 16, 2014.

\* cited by examiner

CONTEXT BASED VOICE ACTIVITY DETECTION SENSITIVITY

FIELD OF THE INVENTION

The present invention relates to speech recognition, and in particular to handling barge-in sounds in interactive speech dialog systems.

BACKGROUND ART

Spoken language understanding systems have been deployed in numerous speech dialog applications which require some sort of interaction between humans and machines. The interaction usually is controlled by the machine which follows a pre-scripted dialog to ask questions of the users and then attempts to identify the intended meaning from their answers (expressed in natural language) and take actions in response to these extracted meanings. For example, FIG. 1 shows the basic functional arrangement of one specific form of a generic dialog system as described more fully in U.S. Pat. No. 7,424,428, incorporated herein by reference.

One important task for constructing effective speech dialog systems is referred to as "endpointing" which also known as Voice Activity Detection (VAD). Ideally, the VAD should be insensitive to background noises of various kinds including background speech, but sensitive to speech directed at the dialog system, especially in order to allow barge-in, i.e. detecting the user's speech during playing a system prompt. Various techniques exist based on energy and frequency, but these are still not optimal.

SUMMARY OF THE INVENTION

Embodiments of the present invention are directed to a speech dialog system such as a call routing system that adjusts a voice activity detection threshold during a speech dialog prompt to reflect a context-based probability of user barge in speech occurring. For example, the context-based probability may be based on the location of one or more transition relevance places (TRPs) in the speech dialog prompt.

In further specific embodiments, the voice activity detection threshold may be provided for a limited sub-set recognition vocabulary. The context-based probability also may be based on syntax and/or pragmatics of the speech dialog prompt. The context-based probability may be built-in design value and/or a variable function responsive to operating history of the speech dialog system.

Embodiments also include a speech recognition engine implemented as one or more computer processes functioning in a computer processor and using a method according to any of the above. Embodiments also include a computer program product implemented in a computer readable storage medium for speech recognition which includes program code for performing a method according to any of the above.

DETAILED DESCRIPTION OF SPECIFIC EMBODIMENTS

When a human listener wants to interrupt a human speaker in person-to-person interactions, they tend to choose specific contextual locations in the speaker's speech to attempt to interrupt. People are skilled at predicting these "Transition Relevance Places" (TRPs), see e.g., the Conversational Analysis of the Ethnomethodologists in the 1970's such as the Conversational Analysis of the Ethnomethodologists in the 1970's such as Sacks, H., Schegloff, E. A. & Jefferson, G., *A Simplest Systematics for the Organisation of Turn-Taking for Conversation*, Language, 50:696-735, (1974); incorporated herein by reference. Cues that are used to predict such TRPs include syntax, pragmatics (utterance completeness), pauses and intonation patterns. Human listeners tend to use these TRPs to try to acceptably take over the next speaking turn, otherwise it is seen as "rude" behavior.

Figure 3:
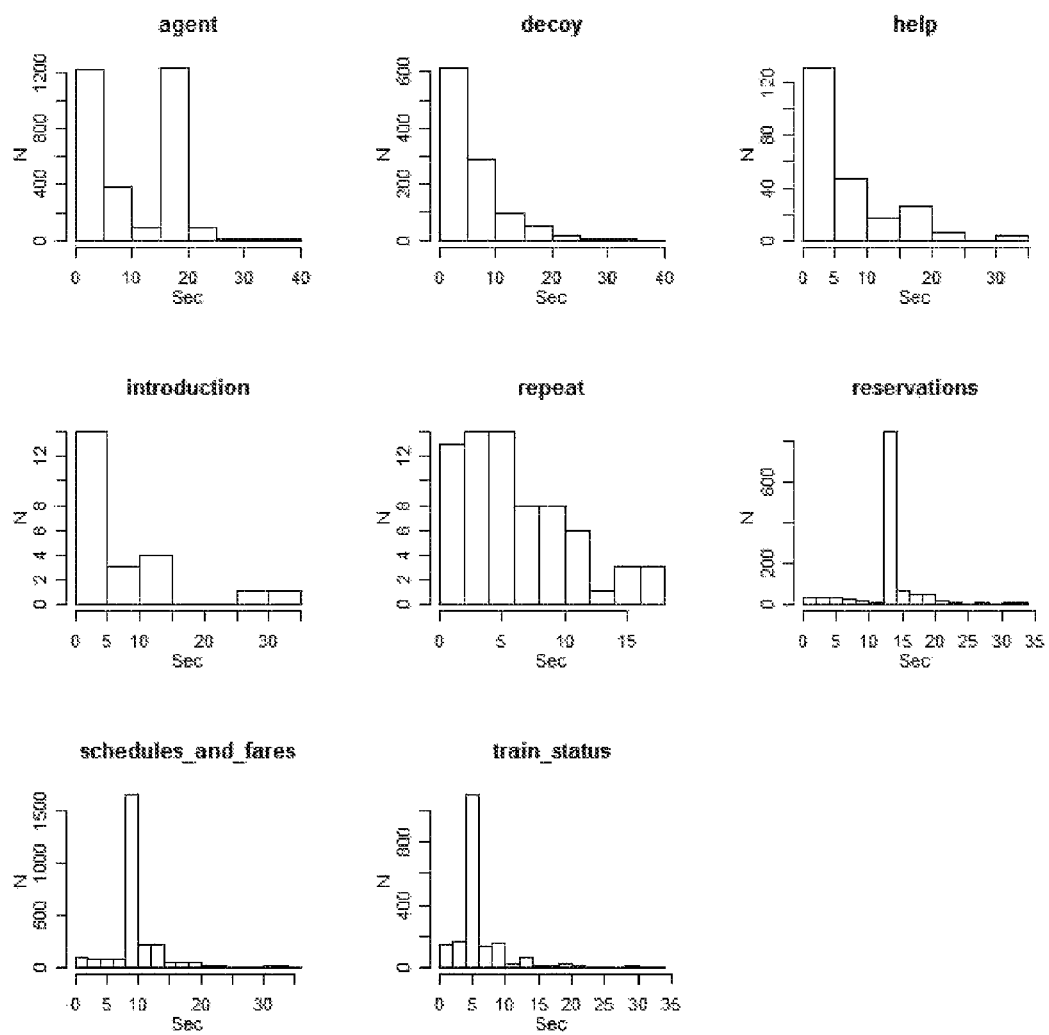
FIG. 3 shows in graphical form data for various specific barge-in experiments.

Experienced users of dialog systems may not care, but at least occasional users may often apply the same turn-taking rules in human-machine speech dialogs. FIG. 3 presents some experimental data showing when callers barged-in to select various menu options. The data graphs in FIG. 3 indicate that barge-in often happened within brief time windows during a dialog prompt.

Based on these ideas, embodiments of the present invention are directed to adjusting speech dialog VADs based on dialog context to be more or less sensitive so as to favor or disfavor barge-in. Context information about the dialog prompts can be used either manually at design time or automatically during design or run-time to determine barge in windows that would correspond to TRPs in human-human interaction. At runtime, instead of having a constant set of parameter settings for the VAD, dynamic parameter settings will be applied depending on the position in the prompt being played. During the TRP windows, barge-in will be made easier, and conversely, it will be made harder (but still possible) during other times. Thus, false barge-in detections at times when barge-ins are less likely and false rejections of barge-ins during TRP windows will both be reduced.

Figure 1:
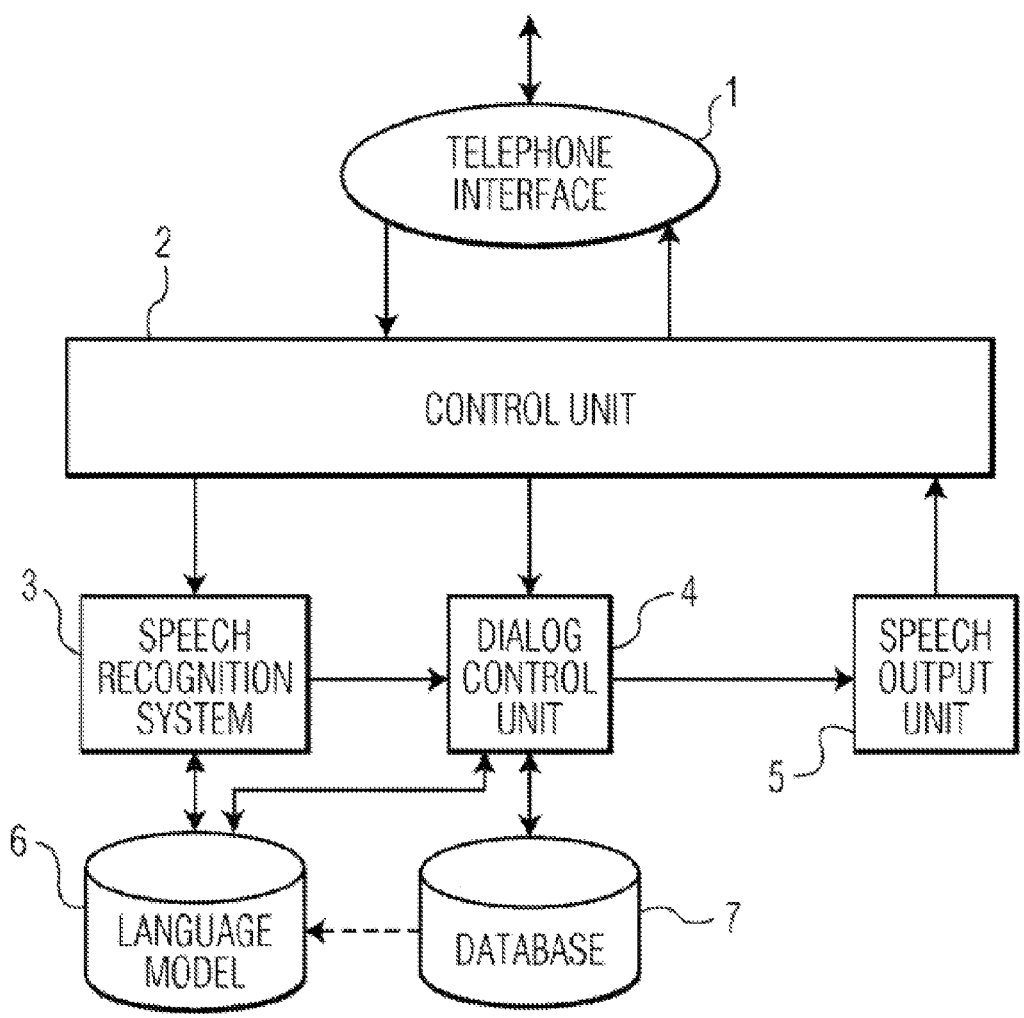
FIG. 1 illustrates a typical process for determining a semantic classification for a human utterance in a generic dialog system.
Figure 2:
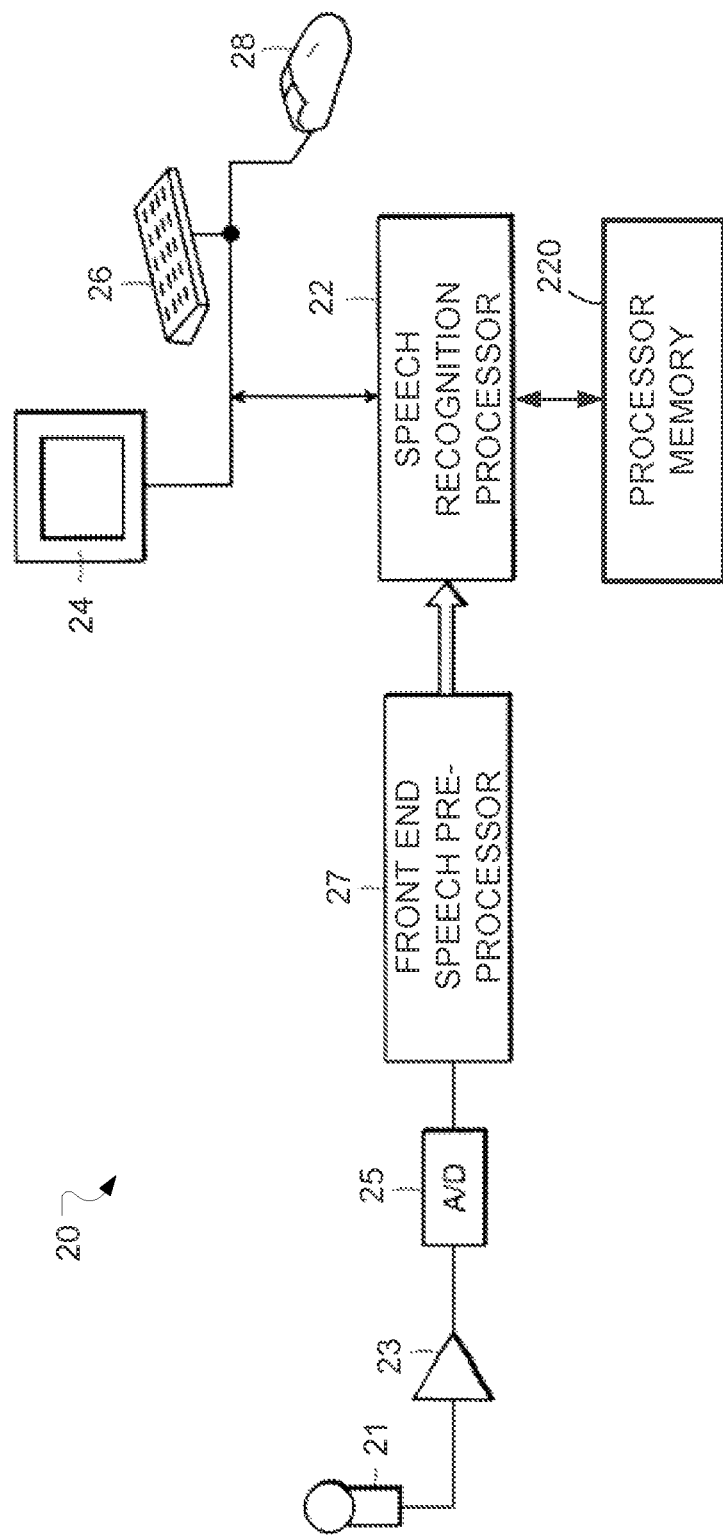
FIG. 2 shows various hardware components of an embodiment of an ASR system according to the present invention.

FIG. 2 shows various hardware components of an embodiment of a speech dialog system according to the present invention as based on the system described, for example, in U.S. Pat. No. 6,785,365, which is incorporated herein by reference. A speech dialog system 200 a dialog prompt generator 202 which provides a dialog prompt signal $S_p$ to an outgoing telephone line 204 for transmission to a human dialog system user at a remote telephone handset 206. The user at the handset 206 provides speech responses $S_u$ which are returned to the system 200 via an incoming or input line. The signals on incoming telephone line 208 are corrupted by line noise, as well as by an uncancelled portion of the echo $S_e$ of the dialog prompt signal $S_p$ along an echo path 212 to a summing junction 214 where it is summed with the user input speech signal $S_u$ to form the resultant system input signal, $S_s$. Local echo cancellation unit 216 suppresses the prompt echo signal $S_e$ from the system input signal $S_s$ to produce an echo suppressed input signal $S_i$.

Barge-in detector 218 determines if the user is attempting to interrupt the dialog prompt signal $S_p$. When a barge-in is detected, control line 224a is activated to open a signal gate 226 to allow the echo suppressed input signal $S_i$ to be input to the system 200. The barge-in detector 218 may also signal the system 200 via control line 224b at the same time to stop the dialog prompt $S_p$, begin processing the echo suppressed input signal $S_i$. Barge-in detector 218 may advantageously be implemented as a hardware device, one or more software modules, or a combination of hardware and software.

In the following discussion, specific ways are discussed to implement context-based VADs based on accompanying the dialog prompts with a corresponding data structure that maps points in time to the setting of one or more sensitivity thresholds of the barge-in detection. For the purposes of this discussion, just one sensitivity parameter is assumed, but in other embodiments, barge-in detection can use multiple parameters with thresholds set independently of each other. So for example, a barge-in mechanism could have an energy-based and a frequency-based component for which there could be a corresponding energy sensitivity threshold and a corresponding frequency-related sensitivity threshold. In such cases, the sensitivity setting derived by any one of the methods such as those described below can easily be mapped to settings for each of the individual sensitivity thresholds.

Figure 4:
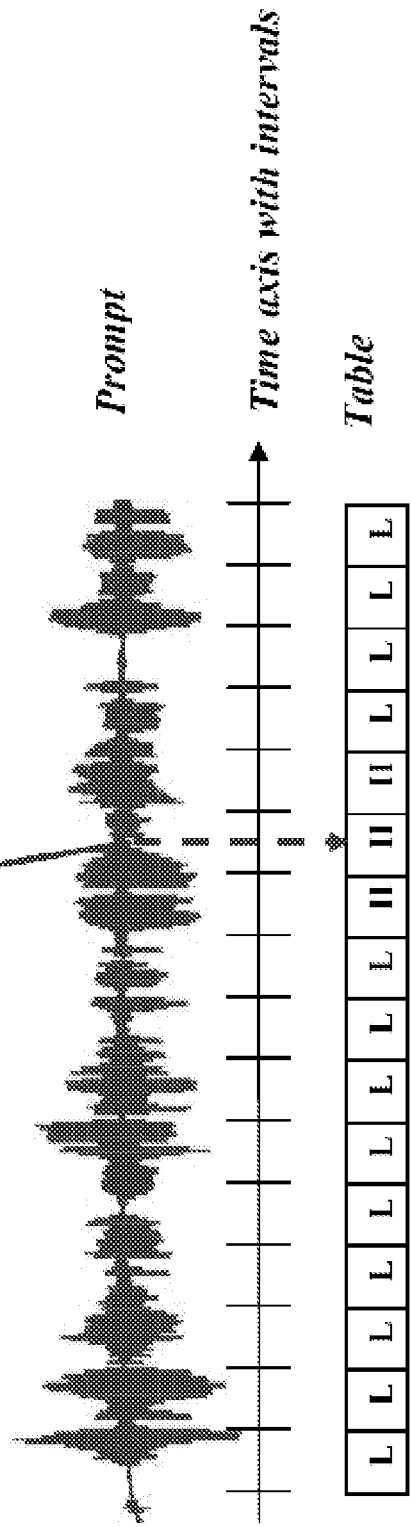
FIG. 4 shows an embodiment using a threshold table to map points in time to a VAD sensitivity setting.

FIG. 4 shows an example of one specific embodiment which uses a data structure in the specific form of a threshold table to map points in time to a sensitivity setting. The top of FIG. 4 shows the orthographic (text) of a sample speech prompt, while just below that, the corresponding speech waveform is shown over a time axis which is divided into short time intervals of equal duration, e.g. 20 ms, 50 ms, 100 ms, etc. The corresponding threshold table will then be an array of some length n equal to the time duration of the dialog prompt divided by the length of each time interval. The $i^{th}$ cell in the table array will then contain a valid value for the sensitivity threshold, for example, as shown, H(igh) or L(ow).

There are a number of specific ways to create such a threshold table data structure for each dialog prompt. For example, a multi-step process can be used to manually mark the VAD thresholds based on dialog context. Specifically, a human expert (e.g. linguist or user interface designer) can identify those positions in the orthographic form of the dialog prompt that are more likely to be barged-in than others, and mark these with a special TRP character such as "*" to indicate a TRP. Typically, this occurs in white space in the orthography, i.e. punctuation marks or spaces between words. In FIG. 4, an example of this is shown by the "*" after the period following the word "prompt". Then when recording the dialog prompts, the time interval positions in the threshold table corresponding to the special TRP character and a certain number of time interval positions before and after the TRP character receive an "H" high sensitivity marking while the other time interval positions in the threshold table will get an "L" low sensitivity marking. Alternatively, in some embodiments where the dialog prompts are recorded by text-to-speech (TTS), the TTS system may automatically create a threshold table by interpreting the special TRP character.

During run time when such embodiments are operating and that dialog prompt is played, a barge-in detection unit of the unit follows along with the playing of the dialog prompt using the threshold table. For example, if the dialog prompts are dynamically played by TTS, the TTS unit may at the same time create the threshold table one time interval at a time and stream the corresponding table values (H or L) to the barge-in detection unit. When a barge-in candidate event occurs, the barge in detector can then use the start time and the system clock to compute the corresponding time interval in the threshold table to determine if a high or low sensitivity threshold should be applied. The foregoing describes using two values for the sensitivity thresholds, high and low, but another embodiment can similarly use three threshold values (high/medium/low) or more. The actual mapping of threshold values to one or more actual parameters of the barge-in detector may be done by an expert by hand.

Rather than or in addition to manually building the VAD thresholds at design time by hand, some embodiments may be based on learning a sensitivity function over time from data developed during run time operation of the dialog system. For example, such data may be available from sampling recordings made during live operation using the dialog prompts and recording throughout the prompt, not just when barge-in detection has triggered. That way, barge-in candidates that are erroneously rejected by the system in its existing configuration are recorded. This can be achieved by recording data throughout the call ("whole call recording"). For further processing, the recordings can later be cut into smaller pieces where each piece relates to a given dialog prompt so that the recording spans the playing time for that prompt.

Figure 5:
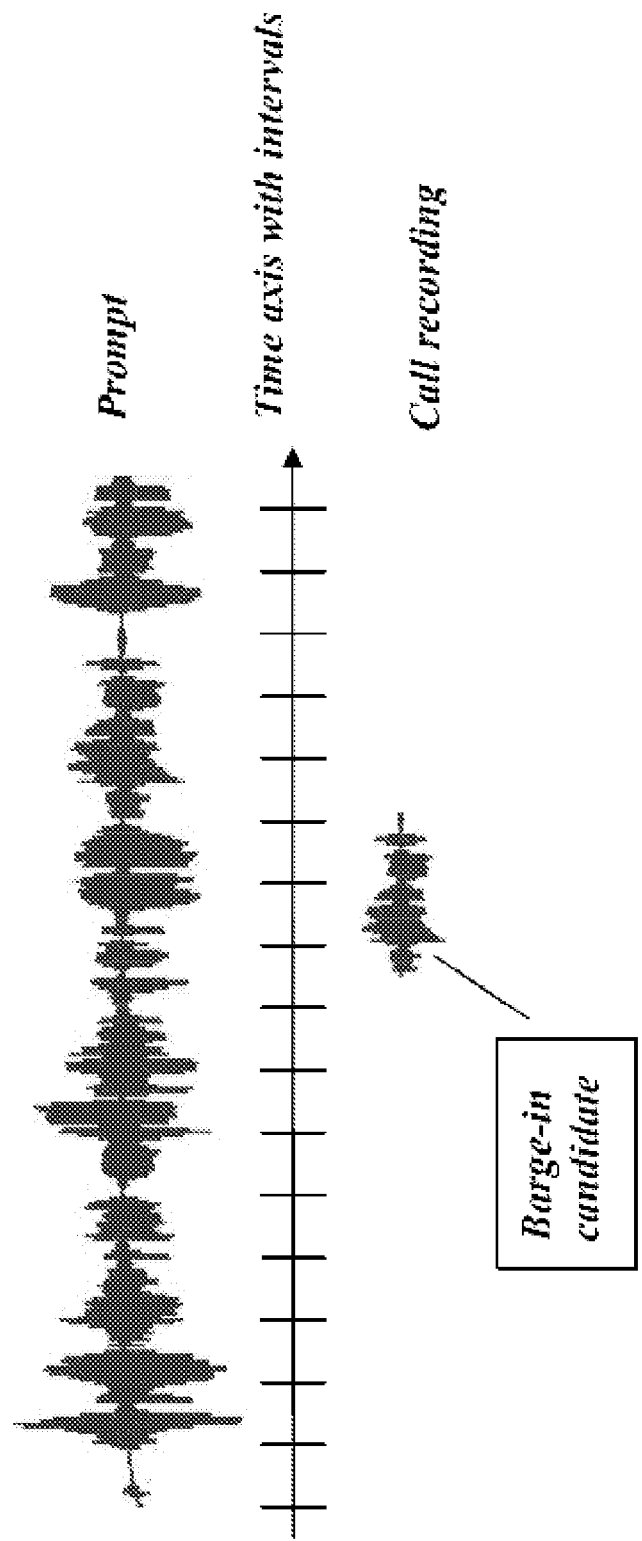
FIG. 5 shows an example of a barge-in candidate from a call recording of a dialog prompt.

For example, with reference to FIG. 5, let $R_p$ be the set of recordings available for each prompt so that the beginning of the recording is synchronous with the start of prompt p being played during the dialog. As shown in FIG. 5, a noise event during the recording that theoretically would trigger the barge-in detection in any of its settings is a potential barge-in event or barge-in candidate. It may be helpful if the data recordings are annotated to mark and distinguish between legitimate barge-in events (caller really wanted to barge-in) and false barge-ins (coughing, background noise). This can be done either manually or automatically by applying heuristics which give scores to barge-in candidates and then label as legitimate all barge-in events that exceed a certain threshold and all others as false barge-ins. One specific such heuristic could use the observation that legitimate barge-ins tend to recur in the same places whereas false barge-ins are more or less evenly distributed over the duration of a prompt since all places are equally likely. Thus the heuristic would compute the median of the frequency of barge-in events per time segment and then give higher scores to events that start in a segment with a frequency of events above the median. Another specific heuristic could give higher scores to barge-in events that lead to a successful recognition (in-grammar utterance). Yet another specific heuristic would give higher scores to barge-in events that occur in dialogs that are completed successfully overall.

Either manual or automatic annotation leads to a modified set of dialog prompts where each prompt is accompanied by an annotated sensitivity table, so that for each time segment, the sensitivity table contains a marker showing whether a legitimate barge-in event, a false barge-in event, or no barge in event started in that segment. Based on this arrangement, an optimal sensitivity threshold can be assigned to each time segment. The results will be a sensitivity table where for each time segment the table shows one of the possible threshold values, High/Low etc. Then a false reject (FR) is a decision by the barge-in detector to reject a barge-in candidate even though the event was a legitimate event as defined in the annotation of the prompt. And similarly a false accept (FA) is a decision of the barge-in detector to accept a barge-in candidate even though it was classified as false in the annotation. Then an optimal VAD sensitivity threshold is one that leads to the lowest sum of FR+FA. This formula assumes that FR and FA are of equal importance. Alternatively, FA and FR events can be weighted according to their impact on the dialog, e.g. FA events might be sees as more problematic than FR events. Then, the alternative formula of a*FA+b*FR can be used for the parameter to minimize where a and b are weights.

A specific such arrangement for context-based VAD thresholds can be implemented in the specific form of computer processes that function in a computer processing environment, for example, one or more computer processes operating in a speech dialog system. Then an algorithm for such an embodiment might be set forth as follows for all the dialog prompts to be processed:

```
Create an array with as many cells as there are time segments
    Loop through time segments of prompt recording where m = current
    time segment
        Create an empty array of length n = number of possible
            sensitivity threshold values
        Loop through prompt recordings Rp
        Let current recording = r
            Loop through n potential threshold values
                Repeat
                    Apply current threshold value to barge-in detector
                    Process the current recording r;
                    If result is a FR or FA starting in the current time
                        segment m
                    Then update array at cell n by adding 1.
                Until the barge-in detector finds no more events
        Pick array cell with minimal value at index i
            If multiple cells with same lowest value, pick any
            If all cells contain same value, pick default (neutral) value
        Set optimal threshold value for current time segment m to $i^{th}$
            possible value
```

The result is an array for each dialog prompt that shows the optimal sensitivity threshold for each time segment. These arrays can be handed over to the runtime dialog system together with the dialog prompt to play. The runtime system will apply the sensitivity threshold for the current time segment whenever a barge-in candidate event occurs.

Another automatic approach to attaching sensitivity thresholds to dialog prompts uses a data base of already marked dialog prompts (e.g., from one of the methods described above). Then for new prompts, a correct sensitivity threshold can be estimated for each time segment by applying a classifier that has been trained on the data base of available marked prompts. A variant of this approach can work on the orthographic form of the dialog prompts and have the classifier classify the breaks between words based on features like preceding words, following words, preceding punctuation etc. This would result in annotation of the prompt as described above and further processing would be similar. Another approach could work on the recorded version of the prompts and use acoustic features, e.g. intonation patterns, where the classifier classifies the time segments.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for a speech dialog system implemented as a plurality of computer processes functioning in a computer processor, the method comprising:
    in one or more computer processes:
        adjusting a voice activity detection threshold of the speech dialog system during a speech dialog prompt to reflect a context-based probability of user barge in speech occurring;
        adjusting the voice activity detection threshold based upon a heuristic that includes a distribution of legitimate barge-ins and false barge-ins;
        receiving speech from a user during the speech dialog prompt; and
        processing the speech from the user using the heuristic to determine whether the speech is a legitimate barge-in,
    wherein the legitimate barge-ins are known to recur in same places in the speech dialog prompt and false barge-ins are known to be distributed over a duration of the speech dialog prompt.

2. A method according to claim 1, wherein the voice activity detection threshold is for a limited sub-set recognition vocabulary.

3. A method according to claim 1, wherein the context-based probability is based on one or more transition relevance places (TRPs) in the speech dialog prompt.

4. A method according to claim 1, wherein the context-based probability is based on syntax of the speech dialog prompt.

5. A method according to claim 1, wherein the context-based probability is based on pragmatics of the speech dialog prompt.

6. A method according to claim 1, wherein the context-based probability is a built-in design value.

7. A method according to claim 1, wherein the context-based probability is a variable function responsive to operating history of the speech dialog system.

8. A speech recognition engine, comprising:
a memory; and
a processor coupled to the memory, the processor and the memory configured to:
adjust a voice activity detection threshold of the speech dialog system during a speech dialog prompt to reflect a context-based probability of user barge in speech occurring;
adjust the voice activity detection threshold based upon a heuristic that includes a distribution of legitimate barge-ins and false barge-ins;
receive speech from a user during the speech dialog prompt; and
process the speech from the user using the heuristic to determine whether the speech is a legitimate barge-in,
wherein the legitimate barge-ins are known to recur in same places in the speech dialog prompt and false barge-ins are known to be distributed over a duration of the speech dialog prompt.

9. The system according to claim 8, wherein the voice activity detection threshold is for a limited sub-set recognition vocabulary.

10. The system according to claim 8, wherein the context-based probability is based on one or more transition relevance places (TRPs) in the speech dialog prompt.

11. The system according to claim 8, wherein the context-based probability is based on syntax of the speech dialog prompt.

12. The system according to claim 8, wherein the context-based probability is based on pragmatics of the speech dialog prompt.

13. The system according to claim 8, wherein the context-based probability is a variable function responsive to operating history of the speech dialog system.

14. An article, comprising:
a non-transitory computer storage medium having stored instructions that enable a machine to:
adjust a voice activity detection threshold of the speech dialog system during a speech dialog prompt to reflect a context-based probability of user barge in speech occurring;
adjust the voice activity detection threshold based upon a heuristic that includes a distribution of legitimate barge-ins and false barge-ins;
receive speech from a user during the speech dialog prompt; and
process the speech from the user using the heuristic to determine whether the speech is a legitimate barge-in,
wherein the legitimate barge-ins are known to recur in same places in the speech dialog prompt and false barge-ins are known to be distributed over a duration of the speech dialog prompt.

15. The article according to claim 14, wherein the voice activity detection threshold is for a limited sub-set recognition vocabulary.

16. The article according to claim 14, wherein the context-based probability is based on one or more transition relevance places (TRPs) in the speech dialog prompt.

17. The article according to claim 14, wherein the context-based probability is based on syntax of the speech dialog prompt.

18. The article according to claim 14, wherein the context-based probability is based on pragmatics of the speech dialog prompt.

19. The method according to claim 1, wherein the false barge-ins are generally evenly distributed.

20. The method according to claim 1, further including adjusting the voice activity detection threshold based upon a likelihood of successful recognition of the barge-in.

21. A method for a speech dialog system implemented as a plurality of computer processes functioning in a computer processor, the method comprising:
in one or more computer processes:
adjusting a voice activity detection threshold of the speech dialog system during a speech dialog prompt based upon a heuristic that includes a distribution of legitimate barge-ins and false barge-ins,
receiving speech from a user during the speech dialog prompt; and
processing the speech from the user using the heuristic to determine whether the speech is a legitimate barge-in,
wherein the legitimate barge-ins are known to recur in same places in the speech dialog prompt and false barge-ins are known to be distributed over a duration of the speech dialog prompt.

22. The method according to claim 1, further including adjusting the voice activity detection threshold to minimize a sum of false rejection and false acceptance barge-ins.

23. The method according to claim 22, further including weighting the false rejections and/or false acceptance barge-ins prior to computing the sum.

24. The method according to claim 1, wherein the heuristic includes computing a median frequency of barge-in events per time segment and weighting scores based upon the median frequency computation.

25. The method according to claim 1, wherein the heuristic includes scoring barge-in events based upon a success of an in-grammar utterance.

* * * * *